(12) United States Patent
Adams et al.

(10) Patent No.: US 11,565,438 B2
(45) Date of Patent: Jan. 31, 2023

(54) METHOD FOR MANUFACTURING AN ENGINEERED STONE AND AN ENGINEERED STONE

(71) Applicant: Dal-Tile, LLC, Dallas, TX (US)

(72) Inventors: Terry Adams, Dallas, TX (US); Claudio Caselli, Dallas, TX (US)

(73) Assignee: Dal-Tile, LLC, Dallas, TX (US)

( * ) Notice: Subject to any disclaimer, the term of this patent is extended or adjusted under 35 U.S.C. 154(b) by 0 days.

(21) Appl. No.: 16/647,055

(22) PCT Filed: Oct. 2, 2018

(86) PCT No.: PCT/US2018/053836
§ 371 (c)(1),
(2) Date: Mar. 13, 2020

(87) PCT Pub. No.: WO2019/070621
PCT Pub. Date: Apr. 11, 2019

(65) Prior Publication Data
US 2020/0262101 A1    Aug. 20, 2020

Related U.S. Application Data

(63) Continuation of application No. 15/722,804, filed on Oct. 2, 2017.

(51) Int. Cl.
*B28B 1/00* (2006.01)
*B29C 67/24* (2006.01)
(Continued)

(52) U.S. Cl.
CPC .............. *B28B 1/005* (2013.01); *B28B 7/007* (2013.01); *B28B 11/001* (2013.01);
(Continued)

(58) Field of Classification Search
CPC ..... B28B 1/005; B28B 7/007; C04B 40/0272; C04B 2111/54; B41M 5/0047
See application file for complete search history.

(56) References Cited

U.S. PATENT DOCUMENTS

| 6,025,023 A | 2/2000 | Valente et al. |
| 7,108,890 B2 | 9/2006 | Horne et al. |
| 2002/0064616 A1* | 5/2002 | Sawatsky ................ C03C 17/32 428/35.7 |

(Continued)

FOREIGN PATENT DOCUMENTS

| GB | 376284 A | 7/1932 |
| KR | 10-0750519 B1 | 8/2007 |

(Continued)

OTHER PUBLICATIONS

Tile Outlets of America (TOA), How Inkjet Technology has Transformed Ceramic and Porcelain Tile, Sep. 15, 2016 (7 pages).
International Search Report and Written Opinion for Related International Application No. PCT/US18/53836, dated Dec. 21, 2018, 10 pages.
Engineered Stone, "Wikipedia," Jun. 8, 2017, [retrieved Nov. 29, 2018 via the Internet at <https://en.wikipedia.org/w/index.php?title=Engineered_stone&oldid=784387601>], 4 pages.
Definition of Decor, Merriam-Webster, 2019.

*Primary Examiner* — Jerzi H Moreno Hernandez
(74) *Attorney, Agent, or Firm* — Troutman Pepper Hamilton Sanders, LLP; James E. Schutz; Chris N. Davis (57) ABSTRACT

A method for manufacturing an engineered stone, the method including: providing a mixture comprising at least a stone or stone like material and a binder; compacting the mixture; curing the binder; and further comprising printing a printed pattern on at least a top surface of the engineered stone.

12 Claims, 3 Drawing Sheets

(51) Int. Cl.

| | |
|---|---|
| *B29C 70/44* | (2006.01) |
| *B29K 509/00* | (2006.01) |
| *C04B 40/02* | (2006.01) |
| *C04B 26/18* | (2006.01) |
| *C04B 20/00* | (2006.01) |
| *C04B 40/00* | (2006.01) |
| *B28B 11/00* | (2006.01) |
| *C04B 26/16* | (2006.01) |
| *C04B 28/04* | (2006.01) |
| *C04B 26/06* | (2006.01) |
| *C04B 26/04* | (2006.01) |
| *B28B 11/04* | (2006.01) |
| *B28B 7/00* | (2006.01) |
| *C04B 111/54* | (2006.01) |

(52) U.S. Cl.
CPC .......... *B28B 11/048* (2013.01); *B29C 67/243* (2013.01); *B29C 70/44* (2013.01); *C04B 20/0076* (2013.01); *C04B 26/04* (2013.01); *C04B 26/06* (2013.01); *C04B 26/16* (2013.01); *C04B 26/18* (2013.01); *C04B 28/04* (2013.01); *C04B 40/0067* (2013.01); *C04B 40/0263* (2013.01); *C04B 40/0272* (2013.01); *B29C 67/244* (2013.01); *B29C 2791/006* (2013.01); *B29C 2791/008* (2013.01); *B29K 2509/14* (2013.01); *C04B 2111/54* (2013.01)

(56) References Cited

U.S. PATENT DOCUMENTS

| | | |
|---|---|---|
| 2005/0271802 A1 | 12/2005 | Satoh |
| 2006/0201349 A1 | 9/2006 | Roberts et al. |
| 2008/0160254 A1* | 7/2008 | Arnold ............... B23K 26/0006 |
| | | 428/141 |
| 2010/0231671 A1 | 9/2010 | Anton et al. |
| 2011/0250404 A1 | 10/2011 | Pervan et al. |
| 2014/0023832 A1 | 1/2014 | Pervan et al. |
| 2014/0231403 A1 | 8/2014 | Stopperan |
| 2015/0251472 A1 | 9/2015 | Yeh |
| 2015/0344712 A1* | 12/2015 | Harrison ............... C09D 11/322 |
| | | 428/206 |
| 2015/0345141 A1* | 12/2015 | Caselli ................. B28B 11/048 |
| | | 347/110 |
| 2016/0229177 A1* | 8/2016 | Yamamoto ........... B41M 5/0011 |
| 2016/0319554 A1 | 11/2016 | Thiers et al. |
| 2019/0009430 A1* | 1/2019 | Scardovi ............. B28B 13/0225 |
| 2019/0225849 A1* | 7/2019 | Bollström ............. C09K 3/149 |

FOREIGN PATENT DOCUMENTS

| | | |
|---|---|---|
| WO | 2007/138529 A2 | 12/2007 |
| WO | 2009/010406 A2 | 7/2016 |
| WO | 2016/113652 A1 | 7/2016 |

OTHER PUBLICATIONS

* cited by examiner

METHOD FOR MANUFACTURING AN ENGINEERED STONE AND AN ENGINEERED STONE

CROSS-REFERENCE TO RELATED APPLICATION

This application is a National Stage Entry of, and claims priority to, PCT Patent Application No. PCT/US2018/053836 which was filed on Oct. 2, 2018, which claims priority to and the benefit of U.S. Nonprovisional patent application Ser. No. 15/722,804, which was filed on Oct. 2, 2017. The entire contents and substance of the aforementioned applications are hereby incorporated by reference in their entireties as if fully set forth herein.

FIELD

The present disclosure relates to a method for manufacturing an engineered stone and an engineered stone.

BACKGROUND

An engineered stone includes a stone material or a stone like material, like for example crushed stones, sands or other minerals but also recycled ceramic, glass and metals, bonded by means of a cured binder like for example resin or cement. More in detail, with engineered stone is intended a composite material formed by a stone material or a stone like material bonded together by means of a cured binder that it is cured at low temperature, wherein with low temperature is intended a temperature below 500° C.

Traditionally, natural stone is used as building material, especially for finishing the buildings like for example for coverings of wall or floor and for producing worktops like kitchen or bathroom countertops and vanities. Natural stones are extracted from mines and subsequently cut and polished to obtain slabs or boards of the desired shape. Due to the mine extraction, natural stones are relatively expensive and produce a high impact on the environment.

Therefore, in the past years methods for manufacturing engineered stones were developed in order to reduce costs and provide a more environment friendly product. A well-known example of such methods is represented by the so called Bretonstone® technology described, for example, in the document, WO 2007/138529. Said document discloses a method for manufacturing an engineered stone which includes the step of: providing a stone material or a stone like material, for example by grinding sand or quartz; mixing the stone or stone like material with a binder, for example a resin powder, in order to obtain a mixture; depositing the mixture in a mold of a press, having shape and dimension similar to those of the final article; press the mixture applying vacuum, with the accompanying application of a vibratory motion at pre-established frequency; the semi-product obtained is then hardened by means of a heat curing process to obtain the engineered stone; the engineered stone is then subjected to finishing steps like cutting or polishing.

Such kind of engineered stone normally includes a one-color decoration. Alternatively, the engineered stones include a décor including artificial veins for imitating a natural stone like marble or granite. As disclosed in WO 2009/010406 such décor is obtained by adding a coloring agent to the mixture before the mixture is deposited in the mold. The mixture is carried by an endless belt above the mold and is loaded into the mold itself by free falling from the end of the belt. The coloring agent is loaded by means of appropriate nozzles to the surface of the mixture substantially in correspondence of the end of the belt so to fall into the mold together with the mixture in a non-controlled manner. Following the vibro-compression step the pigment particles distribute in the mixture thereby generating a veined effect through the entire thickness of the engineered stone. Therefore, with this technique it is not possible to obtain an engineered stone with a reproducible and pre-defined décor.

WO 2016/113652 discloses an equipment and a method for creating programmable chromatic effect in an engineered stone by means of a computer controlled machine. The machine is an anthropomorphous robot or a cartesian robot provided with one or more nozzles for dispensing a coloring agent on the surface of a mixture in a temporary support. The nozzle is connected to a tool that interacts with the surface of the mixture to create grooves or holes to receive the color. Thus, this equipment needs a machine work of the mixture and provides for décor imitating natural stone or woods with a relative low-quality resolution.

Certain embodiments of the present invention provide an alternative method for manufacturing an engineered stone, which, in accordance with several of its preferred embodiments, is directed to solve one or more of the problems arising in the state of the art.

SUMMARY

Thereto, according to a first independent aspect, certain embodiments of the disclosed invention relate to a method for manufacturing an engineered stone, including the steps of:

providing a mixture including at least a stone or stone like material and a binder;

compacting the mixture;

curing the binder; and wherein the method includes the step of printing on at least a top surface of the engineered stone. Preferably, inks are printed on at least a top surface of the engineered stone. Inventors have found that by means of printing step it is possible to reproduce a wide variety of predetermined décor on the engineered stone.

The engineered stone can be manufactured in any desired form although substantially flat shapes like a board, a tile or a slab are preferred. The engineered stone is preferably shaped as a slab wherein with slab is intended a substantial rectangular and flat form, preferably including a surface of minimum 1.5 square meters. In this way, the engineered stone is manufactured in a shape that is sufficiently large to be versatile and adapted to be cut according to the dimension and shape of the final destination of the engineered stone itself, like for example a kitchen or bathroom countertops. According to a preferred embodiment, the slab has a length of at least 2 m, preferably at least 2.5 m, for example 3 m or more, and a width of at least 1 m preferably 1.5 m or more. Moreover, the slab preferably shows a thickness of at least 10 mm, preferably at least 20 mm for example 30 mm.

The stone or stone like material can include any kind of stone, sands, siliceous mineral material, for example quartz, silica sand, clay, feldspar cristobalite granite, talc or calcareous mineral material, for example, calcium carbonate, marble, gypsum. The stone or stone like material can also include ceramic, glass, metals and other inorganic material, for example recycled materials. The stone or stone like material can be in form of powder, granules, shards, grains, aggregates or any other particulate form although granules and powder forms are preferred. Preferably the stone or stone like material is in powder form having an average particle dimension lower than 45 μm, preferably lower than 20 μm. The stone or stone like material is preferably at least the 80% by weight of the mixture, preferably more than the 85% and more preferably more than 90%. According to another embodiment of the invention the stone or stone like material can be in form of aggregates, grains and/or granules having a particles size distribution between 0.1 and 0.7 mm. According to still another embodiment of the invention the stone or stone like material includes at least 60 wt % of grains and/or granules and between 20 to 35 wt % of powder form wherein, for example, the granules have a particles size distribution between 0.1 and 0.7 mm and the powder have an average particle dimension lower than 45 μm, preferably lower than 20 μm.

The binder is a curable substance that is configured to be cured thereby bonding together the particles of the stone or stone like material. The binder can be in any form, i.e. liquid, solid, gel or any form that is suitable to be mixed with the stone or stone like material and to be homogeneously dispersed within. Although any kind of curable substance can be used, heat curable substances are preferred. The binder can be an organic substance, for example a resin, or an inorganic substance, for example a concrete.

In case the binder is an organic substance, it can be either a thermoplastic or a thermosetting resin. For example, thermoplastic resins can be polyolefin resins like polyethylene or polypropylene, polystyrene or polyester like polyethylene terephthalate, whereas examples of thermosetting resins are acrylic resin, epoxy resin, polyurethane, rubber, polyester resin preferably unsaturated polyester resin, vinyl ester resin or the like. For example, in a preferred embodiment the binder is unsaturated polyester resin. The binder is preferably less than the 20% by weight of the mixture, preferably less than the 15% and more preferably less than 10%.

In case the binder is an inorganic substance, it is preferably a cement for example a portland cement. In this case the binder can be up to the 30% by weight of the mixture and the stone or stone like material can be between 70% and 100% by weight.

It is noted that the mixture can also include additives, like for example coupling agents, catalyst or reagents to activate or speed up hardening of the binder, and/or temporary bonding agent like glues or thermoplastic resins that temporarily bonds the stone or stone like material.

It is also noted mixture can include fillers, for example inorganic fillers like sand, quarts, feldspar, silica, calcium carbonate, more particularly in powder form, for example to reinforce the binder that fills the interstices between the stone or stone like material particles. The fillers are preferably mixed to the binder, for example they are dispersed into the resin or the cement to form a binding past or binder pellets destined to be mixed with the stone or stone like material for forming the mixture.

Moreover, reinforcing elements like, for example, fibers or whisker, can be added to the mixture for reinforcing the engineered stone. Preferably reinforcing elements include fiberglass, carbon fiber or metal fibers.

The mixture can be provided in different forms, for example in form of a pasty material or a slip, although an incoherent particulate form is preferred. According to a preferred embodiment wherein the mixture is provided in form of an incoherent material, the mixture includes a first particulate of stone or stone like material and a second particulate of binder mixed together, preferably in powder form. Alternatively, the incoherent particulate can be formed by granulates or pellets wherein each granule includes the stone or stone like material and the binder bonded together for forming the granule. According to this alternative, the stone or stone like material and the binder can be bonded together by means of a temporary bonding agent like a glue or a thermoplastic resin, or the stone or stone like material and the binder can be mechanically or physically bonded together, for example the binder can be a thermoplastic resin partially or fully coating the stone or stone like material, or the stone or stone like material can be dispersed in a solidified thermoplastic resin, or the stone or stone like material and the binder can be compressed together to form said granules.

It is noted that the mixture can be provided directly into a mold, a frame or any other tool suitable to providing a shape to the mixture by means of hopper or feeder, although it is preferred to provide the mixture on a temporary support like for example a conveyor belt or a tray so that it is possible to provides intermediate working step before the compacting phase, like for example machining of the edges of the slab or adding a coloring agent to the mixture.

A coloring agent can be added to the mixture to provide a basic color of the engineered stone. In this way, it is possible to provide a background for the printed pattern like a white, grey, beige or brown background. Alternatively, the coloring agent can be added in such a manner to form a basic décor, e.g. a veined effect imitating the veins or flakes of a marble, a granite or any natural stone. In this way, it is possible to combine the basic décor obtained by the coloring agent with the printed pattern thereby obtaining more complex and pleasing aesthetic effects of the engineered stone. The coloring agent can be either in liquid form or in powder form. The coloring agent can also be either an inorganic or an organic substance.

In case the coloring agent is added to provide a basic color of the engineered stone, it can be dispersed in the mixture before it is loaded in the mold or in the frame or on the temporary support so that the coloring agent colors the bulk of the engineered stone, i.e. the entire body of the engineered stone is colored by the coloring agent. Alternatively, it is possible to provide the coloring agent so that it colors only the surface of the engineered stone. For example, it is possible to provide a coloring agent in order to coat at least partially the surface to be printed so to provide a background for the printed pattern. Such basic color can be obtained either with printing technique, for example a screen printing or a roller printing, or with a coating technique like for example spray technique.

In case the coloring agent is added to create a basic décor, it can be added either after that the mixture is loaded in the mold, in the frame or on the temporary support or contemporary to the loading of the mixture in the mold, in the frame or on the temporary support. In the first case, the coloring agent can be added by a computer controlled machine, like for example an anthropomorphous robot or a cartesian robot, provided with one or more nozzles for dispensing the coloring agent. The nozzle is connected to a tool that interacts with the surface of the mixture to create grooves or holes to receive the coloring agent. In the second case, the coloring agent can be randomly dispersed by free falling from a feeder on the surface of the mixture together with the mixture itself so that the veined effect is obtained in an uncontrolled manner and every engineered stone is provided with a unique décor. According to said alternative embodiment of joining the coloring agent, the coloring agent is preferably distributed in the body of the engineered stone along lines imitating the veins or flakes of a marble, a granite or any natural stone. In both these cases, the basic décor is created in the entire thickness of the engineered stone so that it is visible also form the lateral side of the engineered stone and preferably from any section of the engineered stone itself. For example, the décor is visible also in the new sides generated from a cut created in the engineered stone.

According to a preferred embodiment during the compacting step the mixture is loaded in a mold, a frame or any other tool suitable for providing a shape to the mixture of a press or compacting device. Preferably, the mold or frame can have the shape and dimension similar to those of the final product to be obtain or to those of a semi product of the process. Preferably the mold or frame has the shape and dimension similar to those of a slab or a block. Preferably the compacting step is conducted under vacuum, i.e. vacuum is generated in the mold or frame to help extracting air between the mixture particles. More preferably, vibration is applied to the mold or frame during the pressing step thereby helping to compact of the mixture particles, so that the porosity of the engineered stone is significantly reduced. According to a preferred embodiment both vacuum and vibration are applied to the mixture during the compression.

It is not excluded that the engineered stone is formed according to alternative techniques different from compaction like casting, extrusion or lamination. For example, the mixture, in liquid or pasty form, can be poured into the mold or extruded.

According to an embodiment of the invention the method may include the step of forming a relief structure on the top surface of the engineered stone, for example including protrusions and/or excavation. Preferably the relief structure includes features related to the basic décor and or the printed pattern, for example the relief structure includes protrusions and/or excavations that run substantially parallel with respect to the veins of the imitated natural stone. Preferably the relief structure is created by means of a structured mold during the compacting step, although other techniques are available. For example, the relief structure can be created by means of embossing rollers, or embossed molds after or during the compacting step.

After the compacting step, the engineered stone is carried to a curing station. The cure of the binder can be obtained by means of radiation, heat, chemical curing or other suitable techniques. In any case, the curing step is conducted at a temperature below 500° C., for example below 200° C., for example at room temperature.

In case the binder is a thermosetting resin, the curing step is preferably a heating step because it provides for a homogeneous curing of the binder through the entire body of the engineered stone and it is relatively cheap and easy to control. Preferably the heating step is conducted a temperature below 200° C., more preferably below 100° C., for example at 90° C. During the heating step the binder cures and permeates the interstices between the particles of stone or stone like material thereby bonding together the particles of stone or stone like material and reducing the porosity of the engineered stone.

In case the binder is a thermoplastic resin, the curing step is conducted by heating the mixture up at least around or above the Tg (glass transition temperature), preferably up to the melting temperature of the thermoplastic resin so that the viscous or liquid resin permeates the interstices between the particles of stone or stone like material, and then cooling down the mixture to solidify the thermoplastic resin to bond together the particles of stone or stone like material and reduce the porosity of the engineered stone. The cooling step can be conducted either at room temperature or in a forced manner for example by means of belt cooling or blowing air onto the engineered stone.

In case the binder is a cementitious material, the curing step is a chemical curing wherein an activator like water or carbon dioxide is added to the mixture to activate the hardening of the cement by means of hydration or carbonation reaction.

The printing step can be conducted by means of a wide variety of techniques, for example screen printing or roller printing although digital printing is preferred. Digital printing, preferably inkjet digital printing, allows to reproduce a wide variety of images with a very high resolution. For example, by means of digital printing it is possible to obtain a printed pattern with a resolution up to 660 dpi. Moreover, digital printing is preferred above roller printing and screen printing because it is a more flexible printing solution. For changing the production from one décor to another décor it is not necessary to change printing tools like the rollers or the screens.

It is noted that the printing step can be conducted either before or after the curing step. According to a preferred aspect of the certain embodiments of the invention the step of printing is conducted before the step of curing. In this way, since the engineered stone is not hardened the ink can flow through the interstices between the particles of stone or stone like material thereby penetrating into the thickness of the engineered stone so that after the curing step the engineered stone can be polished without deteriorate the printed pattern. More in particular, the printing step can be conducted either before or after the compacting step. Preferably the printing step is conducted before the compacting step so that the subsequent compacting phase, preferably a vibro-compacting phase, helps the inks to penetrate through the surface of the engineered stone. In this way, the printed pattern is preferably present in a thickness of the compacted engineered stone, called penetration depth, of at least 0.5 mm starting from the top surface, more preferably above 1 mm, for example above 2 mm so that after polishing of the top surface the digital printed pattern is still visible. In case the coloring agent is provided on the engineered stone, the printing step is conducted after the step of providing the coloring agent.

According to another embodiment of the invention, the printed pattern can be provided also on other surfaces of the engineered stone that are different with respect to the top surface, preferably on the edges of the engineered stone i.e. on surfaces that are inclined or substantially perpendicular to the top surface of the engineered stone. In this case a printing equipment with an orientable printing head can be used. Alternatively, multiple printing steps can be conducted, preferably in a sequential order. For example, a first printing step provides for a first printed pattern on the top surface, and a second printing step provides for a second printed pattern on the longitudinal and/or the transversal edge. According to a preferred embodiment the printed pattern on the edges are provided after the curing step, more preferably after machining step like calibration or machining.

It is noted that the printed pattern is preferably applied in a fixed relationship to a predetermined point, such that the print is applied at a predetermined location of the of the slab, e.g. at a fixed distance, that may be zero, from an edge or corner, and that the printed pattern is preferably aligned to an edge, preferably a longitudinal edge of the slab. Such can be obtained through a detection of the upcoming slab, and using this detection to control the printer. Applying the printed pattern in a fixed relation to a predetermined point is advantageous for obtaining corresponding structural features in the relief. Furthermore, in case that the multiple printed patterns are provided on different surfaces of the engineered stone it is possible to match the different printed patterns together to form a single image or decoration that continues from one surface to the other.

According to certain embodiments, either organic or inorganic inks or a combination of both can be used. For example, water based inks, solvent based ink, or sublimation in can be used. Since it is not necessary to fire the engineered stone at high temperature organic inks can be used so that a wide gamut of color for the décor is obtainable. It is noted that the organic ink can be a curable ink, for example a UV, IR curable ink or heat curable ink, and that the method can include a print curing step for curing the printed pattern, wherein the print curing step can be either the same curing step of the engineered stone or a different curing step.

In case inorganic inks, for example ceramic inks, are used a durable printed pattern is obtainable, wherein with durable is meant able to resist to physical and chemical agents like UV radiation, acid or basic attack. Preferably the inorganic inks include particles of pigments having a maximum dimension below 2 µm, for example below 1.5 µm, so that it is possible to obtain a printed pattern having a very high resolution. Moreover, the inventors have surprisingly found that using pigments having a maximum dimension below 2 µm, for example below 1.5 µm, the penetration depth of the printed pattern is significantly increased.

Moreover, the ink can show a viscosity below 70 cP, preferably below 50 cP and/or a surface tension below 25 dyn/cm. The inventors have surprisingly found using inks having low viscosity and/or surface tension it is possible to increase the penetration depth of the ink.

It is noted that the printed pattern can be obtained by means of multiple color inks, for example with four colors, preferably cyan, magenta, yellow and black, or more colors, for example seven or eight colors.

Furthermore, the method can include the step of providing at least the surface to be printed with a primer, for example an ink adhesion promoter or a catalyst, before the step of printing itself. The primer can be for example acrylic, methacrylic, polyurethane, water based, solvent based, styrene. The primer can be provided by means of spray, rollers or any other suitable techniques.

It is noted that the method can also include the step of providing a protective layer to coat partially or entirely at least the top surface of the engineered stone. Preferably, the protective layer is provided above the printed pattern, in this case it is preferable that the protective layer is a transparent or translucent layer. The protective layer can be, for example, a curable resin like an acrylic or epoxy resin. The protective layer can also be configured to improve superficial properties of the engineered stone like for example cleanability, impermeability, antimicrobial behavior, wear resistance, scratch resistance or the like. In order to improve such superficial properties, the protective layer can include fillers, like corundum, silver, titanium dioxide, or others, dispersed therein to improve the superficial properties. The protective layer is preferably provided after the printing step, preferably before the hardening step so that it is hardened together with the mixture and the print. According to an alternative embodiment the protective layer is provided after the curing step of the mixture and the method includes a second hardening step configured to harden the protective layer. The protective layer is provided by means of spray, rollers or any other suitable techniques.

It is clear that the method may also include the step of polishing at least partially the surface of the slab, preferably at least the surface including the printed pattern. The polishing step it is advantageously conducted in order to remove an amount of material from the surface so that the printed pattern is still visible on the polished surface. For example, the polishing step is performed in such a way to remove less than 2 mm of the thickness of the slab, preferably less than 1 mm, for example 0.5 mm. In other words, the polishing step is performed in such a way to reduce the thickness of the slab of an amount smaller than the penetration depth.

Furthermore, the method can include further machining steps like for example cutting, drilling, milling or grinding the engineered stone. In particular, the engineered stone can be cut according to the desired shape and dimension following the specification of the customer design. For example, in case the engineered stone is used as a bathroom or kitchen countertop it can be cut to fit to the furniture on which it must be fitted. Also, through holes can be provided in the engineered stone to accommodate hob, a washbowl, sockets or other item.

Certain embodiments of the invention according to its second independent aspect provide for an engineered stone including a stone or stone like material and a binder bonding together the particles of stone or stone like material wherein the engineered stone includes at least a top surface having a printed pattern. The inventors have found that thanks to this solution an engineered stone with a wider range of décor can be obtained. Furthermore, a higher resolution and more realistic décor can be obtained.

The printed pattern can represent any décor, design or inscription, although it is preferred that the printed pattern represents an imitation of a natural stone, i.e. represents the veins and/or flakes of a natural stone like a marble or a granite.

The engineered stone of the second aspect of the invention is preferably obtained or obtainable through a method in accordance with the first aspect of the invention or the preferred embodiments thereof. The engineered stone may show one or more of the product features described in connection with the first aspect, without necessarily being manufactured in accordance with the method of the first aspect.

Furthermore, certain embodiments of the invention according to its third independent aspect provide for a countertop including an engineered stone that includes at least a top surface having a printed pattern. The countertop can be used in a kitchen, a bathroom as well as any other environment. The countertop preferably includes holes for accommodate a hob, a washbowl, a socket or any other item. The countertop of the third aspect preferably includes an engineered stone in accordance with the aforementioned second aspect and/or an engineered stone obtained or obtainable through a method in accordance with the first aspect of the invention.

It is noted that the characteristic that the engineered stone includes a protective layer forms an inventive idea irrespective of the presence of a top surface including a décor and, in particular, irrespective of the top surface including a printed pattern. Thus, according to a fourth independent aspect, certain embodiments of the invention provide for an engineered stone including a stone or stone like material and a binder bonding together the stone or stone like material wherein the engineered stone includes at least a top surface and wherein the engineered stone includes a protective layer to coat partially or entirely at least the top surface.

It is clear that the engineered stone, as mentioned in all aspects of the invention, is not limited to the use as a countertop but it can be used as a floor element for floor covering, wall panels, internal or external cladding or panels for furniture and vanities as well.

With the intention of better showing the characteristics of the invention, in the following, as an example without any limitative character, several preferred embodiments are described with reference to the accompanying drawings, wherein:

DETAILED DESCRIPTION

Figure 1:
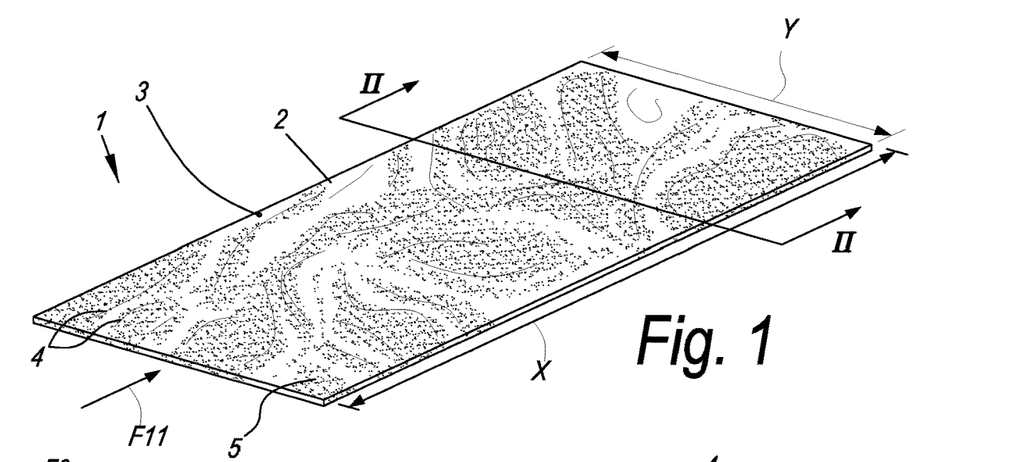
FIG. 1 is a perspective view of an engineered stone in accordance with an example embodiment.

Referring to FIG. 1, it is shown an engineered stone 1 including a stone or stone like material and a cured binder that bonds together the particles of stone or stone like material. The engineered stone 1 is preferably made in form of a slab 2 having a length X of at least 2 m, preferably at least 2.5 m, for example 3 m or more, and a width Y of at least 1 m preferably 1.5 m or more. Moreover, the engineered stone shows a thickness Z of at least 10 mm, preferably at least 20 mm for example 30 mm.

The engineered stone 1 includes at least a top surface 3 provided with a printed pattern 4. The printed pattern 4 can represent any décor, design or inscription, although it is preferred that the printed pattern 4 represents an imitation of a natural stone, i.e. represents the veins and/or flakes of a natural stone like a marble or a granite.

Figure 2:
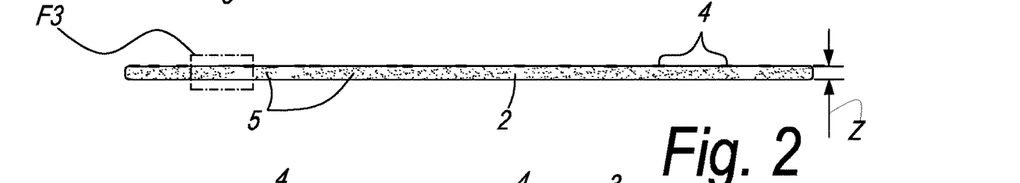
FIG. 2 shows the cross section along the line II-II indicated in FIG. 1.
Figure 3:
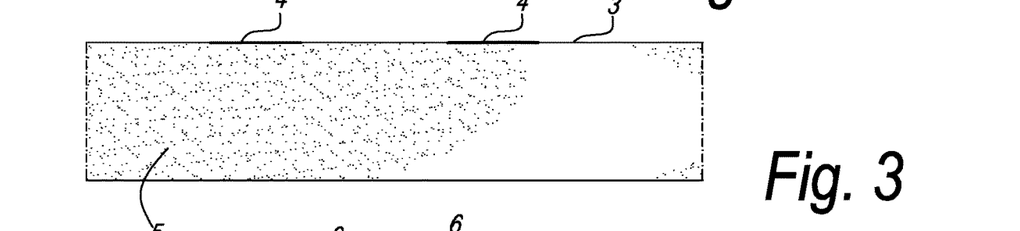
FIG. 3 shows a view on the area F3 indicated on FIG. 2.

According to a variant of the invention, the engineered stone 1 can include a basic décor 5 defining a background for the printed pattern 4. For example, the basic décor 5 represents an imitation of a natural stone, i.e. represents the veins and/or flakes of a natural stone like a marble or a granite. In this case the printed pattern 4 above the basic décor 5 can represent special feature or special effects of the imitated natural stone. As shown from FIGS. 2 and 3, the basic décor 5 is preferably created on the entire thickness of the engineered stone 1 so that it is visible also form the lateral side of the engineered stone 1 and preferably from any section of the engineered stone 1 itself.

Figure 4:
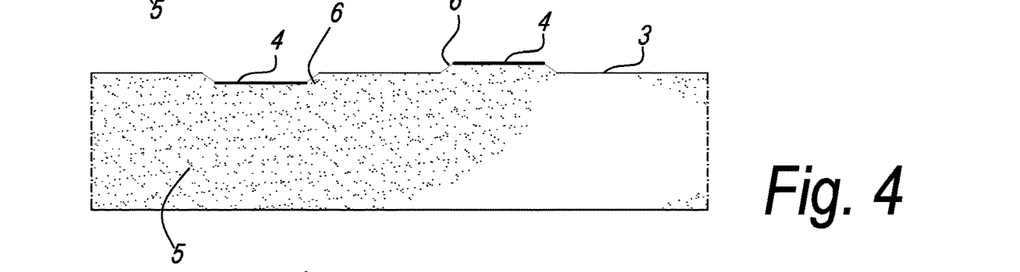
FIG. 4 shows a view on the area F3 indicated on FIG. 2 according to a different embodiment.

According to a preferred embodiment, the top surface 3 of the engineered stone 1 is smooth, for example polished. FIG. 4 shows an alternative embodiment wherein the top surface 3 include a relief structure 6, for example including protrusions and/or excavations. Preferably the relief structure 6 includes features related to the basic décor 5 and/or the printed pattern 4, for example the relief structure 6 includes protrusions and/or excavations that runs substantially parallel with respect to the veins of the imitated natural stone represented by the basic décor 5 and/or the printed pattern 4.

Figures 5, 6, 7:
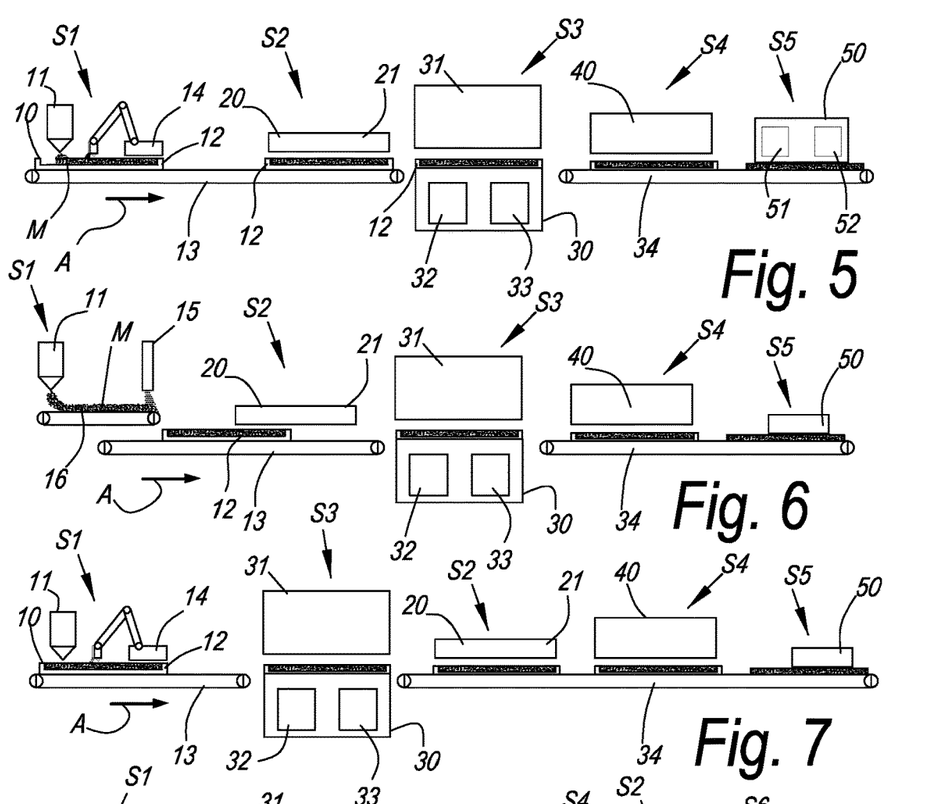
FIG. 5 shows some steps of a method in accordance with an example embodiment of the invention.
FIG. 6 shows some steps of a method in accordance with a variant of the invention.
FIG. 7 shows some steps of a method in accordance with a further variant of the invention.

FIG. 5 shows a method for manufacturing the engineered stone 1 illustrated in FIGS. 1 to 4. The method includes the step S1 of providing a mixture M including at least a stone or stone like material and a binder.

The stone or stone like material can include any kind of stone, sands, siliceous mineral material, for example quartz, silica sand, clay, feldspar cristobalite granite, talc or calcareous mineral material, for example, calcium carbonate, marble, gypsum. The stone or stone like material can also include ceramic, glass, metals and other inorganic material, for example recycled materials. The stone or stone like material can be in form of powder, granules, shards or any other particulate form although powder form is preferred. Preferably the stone or stone like material is in powder form having an average particle dimension lower than 45 μm, preferably lower than 20 μm. The stone or stone like material is preferably at least the 80% by weight of the mixture, preferably more than the 85% and more preferably more than 90%. According to another embodiment of the invention the stone or stone like material can be in form of aggregates, grains and/or granules having a particles size distribution between 0.1 and 0.7 mm. According to still another embodiment of the invention the stone or stone like material includes at least 60 wt % of grains and/or granules having a particles size distribution between 0.1 and 0.7 mm and between 20 to 35 wt % of powder form having an average particle dimension lower than 45 μm, preferably lower than 20 μm.

The binder is a curable substance that is configured to be cured thereby bonding together the particles of the stone or stone like material. The binder can be in any form, i.e. liquid, solid, gel or any form that is suitable to be mixed with the stone or stone like material and to be homogeneously dispersed within. Preferably, the binder is in powder or pellet form. Although any kind of curable substance can be used, heat curable substances are preferred. The binder can be an organic substance, for example a resin, or an inorganic substance, for example a concrete or silica.

According to the preferred embodiments shown in FIGS. from 5 to 8, the binder is a thermosetting resin like embodiment the binder is (polyester, polystyrene, acrylic or epoxy resin). The binder is preferably less than the 20% by weight of the mixture, preferably less than the 15% and more preferably less than 10%.

The mixture M can also include additives, like for example catalyst or reagents to activate or speed up hardening of the binder, and/or temporary bonding agent like glues or thermoplastic resins that temporarily bonds the stone or stone like material.

Moreover, the mixture M can include fillers, for example inorganic fillers like sand, quarts, feldspar, silica, calcium carbonate in fine powder form to reinforce the binder that fills the interstices between the stone or stone like material particles. The fillers are preferably mixed to the binder, for example they are dispersed into the resin or the cement to form a binding past or binder pellets destined to be mixed with the stone or stone like material for forming the mixture.

The components of the mixture M are mixed together and are provided on a temporary support 10 by means of a feeding device 11, for example a hopper. The temporary support 10 can be a mold, a frame, a tray or a conveyor, for example a conveyor having lateral containment means for providing the mixture of a shape similar to that of the final slab. In the embodiment shown in FIG. 5 the temporary support 10 is in the form of a mold 12 carried by a first conveyor 13, for example a conveyor belt, through the direction A.

According the preferred embodiment shown in the figures, the mixture M is provided in form of an incoherent particulate, and includes a first particulate of stone or stone like material and a second particulate of binder mixed together, preferably in powder form for example into the feeding device 11.

The method can further include the step of forming the basic décor 5 on the engineered stone 1. In the embodiment shown FIG. 5 a computer controlled machine 14, for example an anthropomorphous robot can distribute a coloring agent on the engineered stone. According to a preferred embodiment the computer controlled machine is provided with a nozzle for delivering the coloring agent that is connected to a tool, like a knife or a mill, that is configured for forming grooves or recess, into the mixture M inside the temporary support 10, adapted to receive the coloring agent. Thus, the computer controlled machine 14 can create colored lines or spots for example defining the veins of a natural stone following a predetermined input received from a computer.

FIG. 6 shows an alternative embodiment of adding the coloring agent, wherein the coloring agent is provided by free falling from a coloring agent feeder 15 feeder onto the mixture M. More in detail, the mixture M is firstly fed on a temporary conveyor 16 placed substantially above the temporary support 10 so that it can free fall on the temporary support from an end of the temporary conveyor 16. The coloring agent is fed from the coloring agent feeder 15 onto the top surface of the mixture M substantially in correspondence of the end of the temporary conveyor 16 so that the mixture and the coloring agent contemporary free fall on the temporary support 10 and the coloring agent is randomly dispersed into the mixture M.

Referring back to FIG. 5, the method includes the step S2 of printing the printed pattern 4 onto the top surface of the engineered stone 1, preferably by printing an ink. In the example, the temporary support 10 conveyed by the first conveyor 13 is conveyed to a printing station 20 provided with a printing device 21. According to the preferred embodiment shown in FIG. 5 the printing device 21 is a digital printer, preferably an inkjet digital printer.

For example, the printing device 21 is an inkjet digital printer including a printing head adapted to print with four or more colors. More in detail, the printed pattern 4 can be obtained by means of multiple color inks, for example with four colors, preferably cyan, magenta, yellow and black, or more colors, for example seven or eight colors.

According to the preferred embodiment organic inks are used for providing the printed pattern 4 on the engineered stone 1. Preferably the inks are curable inks, for example UV, IR or heat curable inks.

The method further includes the step S3 of compacting the mixture M. according to the embodiment shown in FIG. 5, the mold 12 conveyed to the firs conveyor 13 is moved to a compacting station 30 including a press 31 configured to apply a pressure to the Mixture M into the mold 12. In the present embodiment, the mold 12 is the same used as temporary support 10 but it is clear that according to different embodiment the mold 12 used in the press 31 can be different from the temporary support 10.

Preferably the compacting station 30 includes also a vibrating unit 32 configured to apply a vibration to the mixture during the compacting step S3. Moreover, according to the preferred embodiment, the compacting station 30 includes also a vacuum unit 33 configured to create vacuum into the mold 12 during the compacting step S3.

Figure 9:
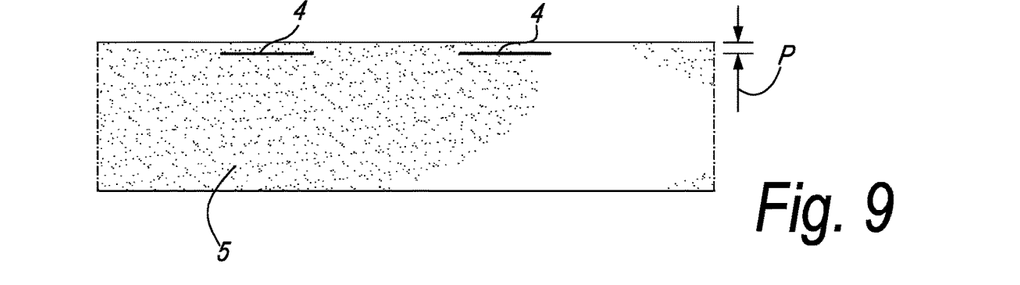
FIG. 9 on a larger scale shows a view on the area F3 indicated on FIG. 2 before the engineered stone is polished.

In the embodiment shown in FIG. 5, with reference to FIG. 9 also, the vibration applied to the mixture M during the compacting step S3 helps the ink of the printed pattern 4 to permeates the mixture M so to penetrate through the top surface 3 of the slab for a penetration depth P of at least 0.5 mm starting from the top surface, more preferably of 1 mm, for example of 2 mm.

The method further includes a curing step S4 for curing the binder of the mixture M thereby bonding together the stone or stone like materials and, thus, obtaining the slab 2 of engineered stone 1. According to the embodiment shown in FIG. 5 the compacted mixture is moved from the compacting station 30 to a second conveyor 34 that conveys the compacted mixture M to a curing station 40.

According to the preferred embodiment, the curing station 40 includes a heating device 41 configured to heat curing the mixture M, i.e. it is configured to heat the mixture M up to the curing temperature of the binder. Preferably the heating temperature is below 200° C., more preferably below 100°, for example 90° C.

The method, according to certain embodiments of the invention, can further include one or more machining steps S5, for example a polishing step. According to the preferred embodiment shown in the FIGS. the engineered stone is moved by the second conveyor 34 to a machining station 50 including a polishing device 51. The polishing device 51 is configured to polish the top surface 3 of the slab 2. Preferably the polishing step S5 is conducted in such a way to remove a very limited amount of material from the top surface 3 of the slab, and in particular it is conducted in such a way that after the polishing step the printed pattern 4 is visible from the top surface 3 of the slab 2. For example, the polishing step S5 is conducted in such a way to remove less than less than 2 mm of the thickness of the slab, preferably less than 1 mm, for example 0.5 mm, i.e. less than the penetration depth P from the top surface 3.

The method can include further machining steps S5, like for example cutting, drilling or milling step. For example, the machining station 50 can include a cutting device for cut the slab 2 according to the shape and dimension of the design of the desired final use of the engineered stone 1.

Figures 8, 10:
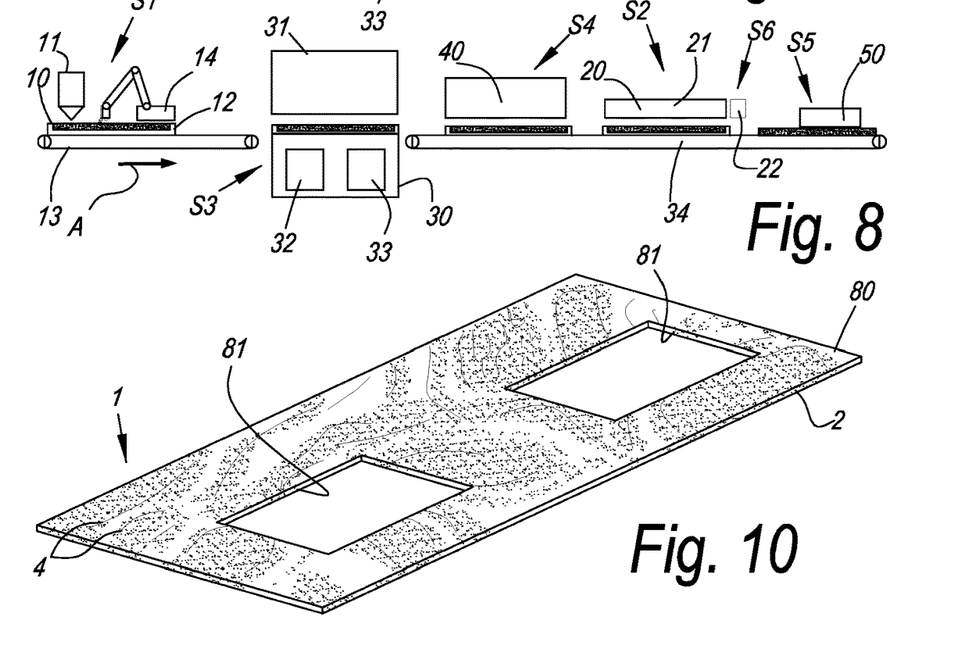
FIG. 8 shows some steps of a method in accordance with still another variant of the invention.
FIG. 10 is a perspective view of a countertop including an engineered stone in accordance with an example embodiment of the invention.

For example, FIG. 10 shows a countertop 80 including the engineered stone 1, for example made starting from the slab 2, that includes through holes 81 for accommodate a hob, a washtub, a socket or any other item.

FIG. 7 shows a different embodiment of the method wherein the printing step S2 is conducted after the compacting step S3 and before the curing step S4. In this case the ink printed pattern 4 can still permeate the mixture through the interstices between the particles of stone or stone like material since the binder is not yet cured.

FIG. 8 shows a further embodiment, wherein the printing step S2 is conducted after the heating step S4. In this case, the method can include a print curing step S6 for curing the printed pattern on the already cured engineered stone 1. For example, the engineered stone 1 is conveyed by the second conveyor 33 from the curing station 40 to the printing station 20 and from the printing station 20 that includes a print curing device 22.

Figures 11, 12, 13, 14, 15:
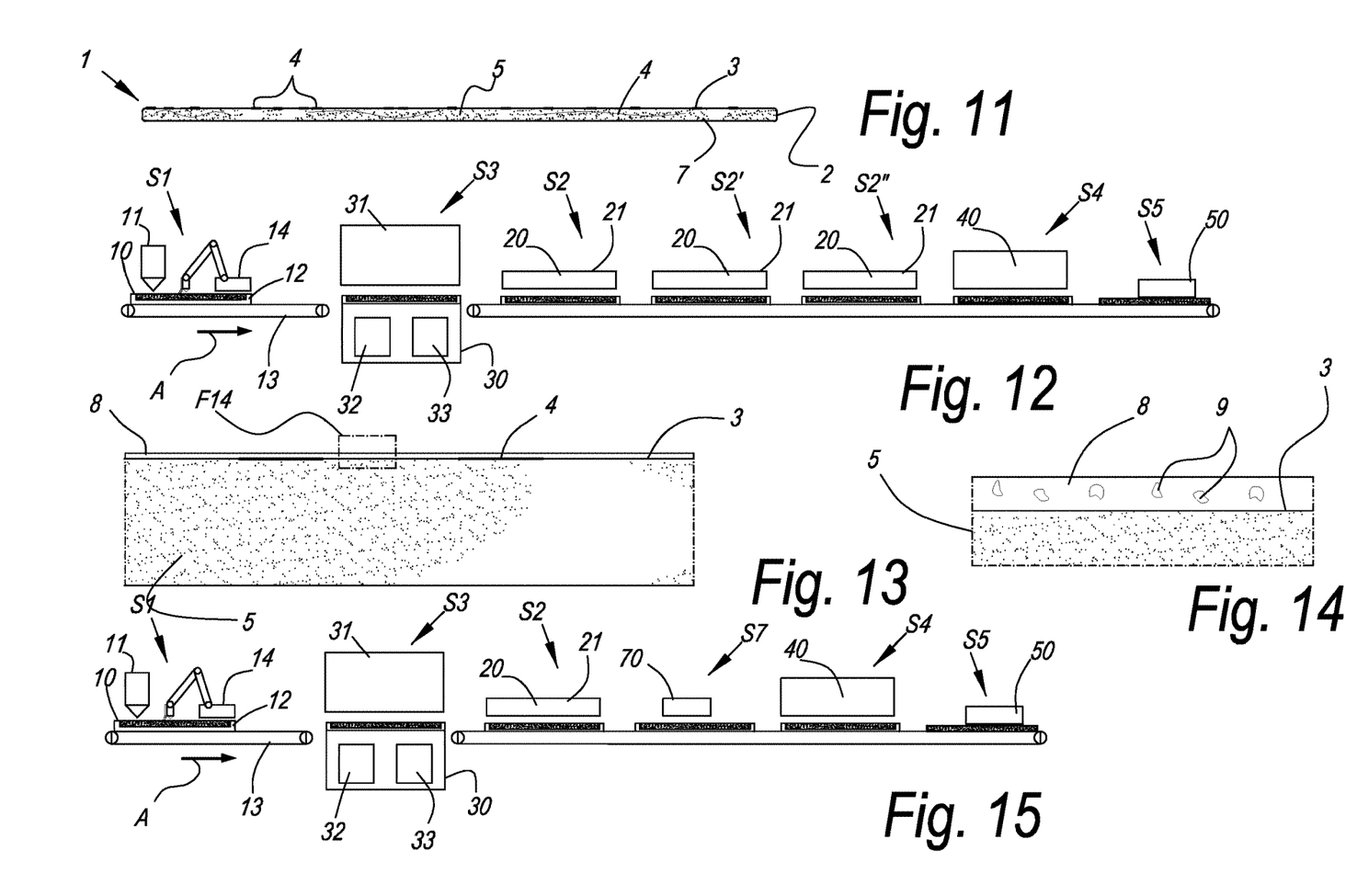
FIG. 11 is a view along direction F11 of FIG. 1 of the engineered stone according to a still alternative embodiment.
FIG. 12 shows some steps of a method in accordance with a further variant of the invention for the manufacturing of the engineered stone of FIG. 11.
FIG. 13 on a larger scale shows a view on the area F3 indicated on FIG. 2 according to another different embodiment.
FIG. 14 on a larger scale shows a view on the area F14 indicated on FIG. 13.
FIG. 15 shows some steps of a method in accordance with a further variant of the invention for the manufacturing of the engineered stone of FIGS. 13 and 14.

FIG. 11 shows a further embodiment of the invention wherein the slab 2 includes edges 7 provided with the printed pattern 4. FIG. 12 shows a method for forming the slab 2 of FIG. 9 wherein subsequent printing steps S2, S2', S" are conducted in a sequential order and wherein each printing step S2, S2', S2" for printing on a different surface with respect to the others printing steps. According to this embodiment the printing station 20 can include a plurality of printing devices 21 wherein each printing device 21 is configured to print on a different surface.

FIG. 13 shows an embodiment of the invention wherein the engineered stone 1 includes a protective layer 8 coating partially or entirely at least the top surface 3 of the engineered stone 1. In the embodiment shown the protective layer 8 is provided above the printed pattern 4 and it is preferable a transparent or translucent layer. For example, the protective layer 8 is a curable resin like an acrylic or epoxy resin.

As visible in FIG. 14, the protective layer 8 advantageously includes fillers 9, like corundum, silver, titanium dioxide, or others, dispersed therein to improve the superficial properties of the engineered stone 1 like for example wear and scratch resistance and antimicrobial behavior.

FIG. 14 shows a method for forming the engineered stone 1 of FIG. 13 that, subsequent printing steps S2, includes the step S7 of providing the protective layer 8 above the printed pattern 4. In the example shown in FIG. 12 the coating step S7 is conducted before the curing step S4 so that the protective layer 8 is cured together with the ink and the engineered stone 1. According to said embodiment the engineered stone 1 is conducted from the printing station 20 to a coating station 70 provided with at least a coating device 71, for example a roller or a sprayer, configured to provide the protective layer 8 above the printed pattern 4, subsequently the compacted mixture is carried to the curing station S4 to be cured. FIG. 15 shows some steps of a method in accordance with FIG. 14.

The present invention is in no way limited to the hereinabove described embodiments, but such floor, floor covering and floor elements may be realized according to different variants without leaving the scope of the present invention.

Further, as is clear from the content of the description, the certain embodiments of the present invention relates to one or more of the items as listed below, numbered from 1 to 21:

1.—A method for manufacturing an engineered stone (1) including the step of:
providing (S1) a mixture (M) including at least a stone or stone like material and a binder;
compacting (S3) the mixture (M);
curing (S4) the binder; and wherein the method includes the step of printing (S2) on at least a top surface (3) of the engineered stone (1).

2.—The method in accordance to item 1, wherein the printing step (S2) is a digital printing step.

3.—The method in accordance to item 2, wherein the printing step (S2) is an inkjet digital printing step.

4.—The method in accordance to any of the previous items, wherein the printing step (S2) is conducted before the curing step (S4).

5.—The method in accordance to any of the previous items, wherein the printing step (S2) is conducted before the compacting step (S3).

6.—The method in accordance to any of the previous items, wherein the mixture (M) is provided on a temporary support (10) and the printed pattern (4) is provided on a top surface (3) of the mixture (M) on the temporary support (10).

7.—The method in accordance to any of the previous items, wherein the printed pattern (4) is formed with at least an organic ink.

8.—The method in accordance to any of the previous items, wherein the printed pattern (4) is formed with at least an inorganic ink.

9.—The method in accordance to any of the previous items, wherein it includes the step of adding a coloring agent to the mixture (M) to provide a basic color.

10.—The method in accordance to any of the previous items, wherein it includes the step of adding a coloring agent to the mixture (M) in such a manner to provide a basic décor (5).

11.—The method in accordance to item 10, wherein the basic décor (5) is a veined effect imitating a natural stone.

12.—The method in accordance to any of the previous items, wherein it includes a further step of printing a printed pattern (4) on a surface (8) that is different with respect to the top surface (3) of the engineered stone (1).

13.—An engineered stone (1) including a stone or stone like material and a binder bonding together the stone or stone like material wherein it includes at least a top surface (3) having a printed pattern (4).

14.—The engineered stone (1) in accordance to item 13, wherein the printed pattern (4) is a digital printed pattern.

15.—The engineered stone (1) in accordance to any of items 13 or 14, wherein it further includes a basic décor (5).

16.—The engineered stone (1) in accordance to item 15, wherein the basic décor (5) is present in to the entire thickness of the engineered stone.

17.—The engineered stone (1) in accordance to any of items from 13 to 15, wherein it includes a further surface (8) different with respect to the top surface (3) and wherein the further surface (8) is provided with the printed pattern (4).

18.—The engineered stone (1) in accordance to any of items from 13 to 16, wherein the engineered stone (1) is in form of a slab (2).

19.—The engineered stone (1) in accordance to item 18, wherein the slab (2) has a width (Y) of at least 1 mm and a length (X) of at least 2 m.

20.—The engineered stone (1) in accordance to item 18 or 17, wherein the slab (2) has a thickness (Z) of at least 10 mm.

21.—A countertop (80) including an engineered stone (1) and including at least a top surface (3) having a printed pattern (4).

In the present description, numerous specific details are set forth. However, it is to be understood that embodiments of the disclosed technology may be practiced without these specific details. In other instances, well-known methods, structures, and techniques have not been shown in detail in order not to obscure an understanding of this description.

References to "one embodiment," "an embodiment," "example embodiment," "some embodiments," "certain embodiments," "various embodiments," etc., indicate that the embodiment(s) of the disclosed technology so described may include a particular feature, structure, or characteristic, but not every embodiment necessarily includes the particular feature, structure, or characteristic. Further, repeated use of the phrase "in one embodiment" does not necessarily refer to the same embodiment, although it may.

Unless otherwise noted, the terms used herein are to be understood according to conventional usage by those of ordinary skill in the relevant art. In addition to any definitions of terms provided below, it is to be understood that as used in the specification and in the claims, "a" or "an" can mean one or more, depending upon the context in which it is used. Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Unless otherwise specified, the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Also, in describing example embodiments, certain terminology is used for the sake of clarity. It is intended that each term contemplates its broadest meaning as understood by those skilled in the art and includes all technical equivalents that operate in a similar manner to accomplish a similar purpose.

While certain embodiments of the disclosed technology have been described, it is to be understood that the disclosed technology is not to be limited to the disclosed example embodiments, but covers various modifications and equivalent arrangements included within the scope of the appended claims. Although specific terms are employed herein, they are used in a generic and descriptive sense only and not for purposes of limitation.

This written description uses examples to disclose certain embodiments of the disclosed technology, including the best mode, and to enable any person skilled in the art to practice the disclosed technology, including making and using any devices or systems and performing any incorporated methods. The patentable scope may include other examples that occur to those skilled in the art. Such other examples are intended to be within the scope of the claims if they have structural elements as the claims, or if they include equivalent structural elements with insubstantial differences from the literal language of the claims.

What is claimed is:

1. A method for manufacturing an engineered stone comprising the steps of:
    providing a mixture comprising at least a particulate material and a binder;
    adding a coloring agent to the mixture in such a manner to provide a basic décor;
    compacting the mixture;
    curing the binder to form an engineered stone;
    polishing the top surface of the cured engineered stone;
    printing a pattern with at least one organic ultraviolet (UV) curable ink on a first surface of the cured engineered stone, the first surface being a top surface of the cured engineered stone; and
    curing the at least one organic UV curable ink,
    wherein the printing step comprises inkjet digital printing,
    wherein the printing step is performed after the compacting step, and
    wherein the basic décor and the printed pattern are both visible on at least the top surface of the cured engineered stone.

2. The method according to claim 1, wherein the basic décor is a veined effect imitating a natural stone.

3. The method according to claim 1, further comprising printing a printed pattern on a second surface of the cured engineered stone that is different than the top surface of the cured engineered stone.

4. The method according to claim 1 further comprising the step of providing a protective layer to at least partially coat at least the top surface of the cured engineered stone.

5. The method according to claim 4, wherein the protective layer is a transparent or translucent layer and is provided above the printed pattern.

6. The method according to claim 4, wherein the protective layer comprises a cured resin.

7. The method according to claim 5, wherein the protective layer is an acrylic or epoxy resin.

8. The method according to claim 6 further comprising the step of curing the protective layer.

9. The method according to claim 1, wherein the printed pattern comprises an imitation of a natural stone.

10. The method according to claim 9, wherein the printed pattern comprises an imitation of veins and/or flakes of a natural stone.

11. The method according to claim 1, wherein the basic décor is present in the entire thickness of the cured engineered stone.

12. The method according to claim 1, wherein the step of polishing is performed before printing.

* * * * *